(No Model.)
H. A. BRUHNS.
RAIL SWEEPER.
No. 547,061. Patented Oct. 1, 1895.
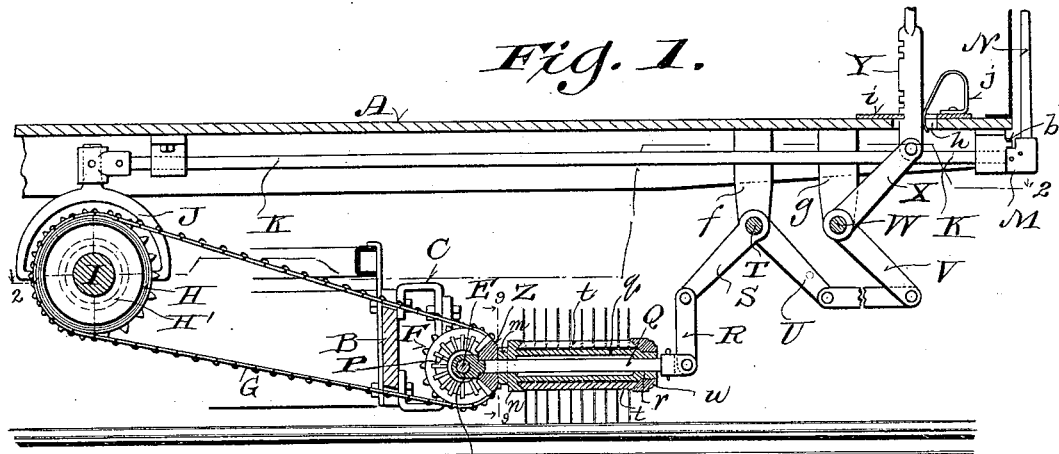
Fig. 1.
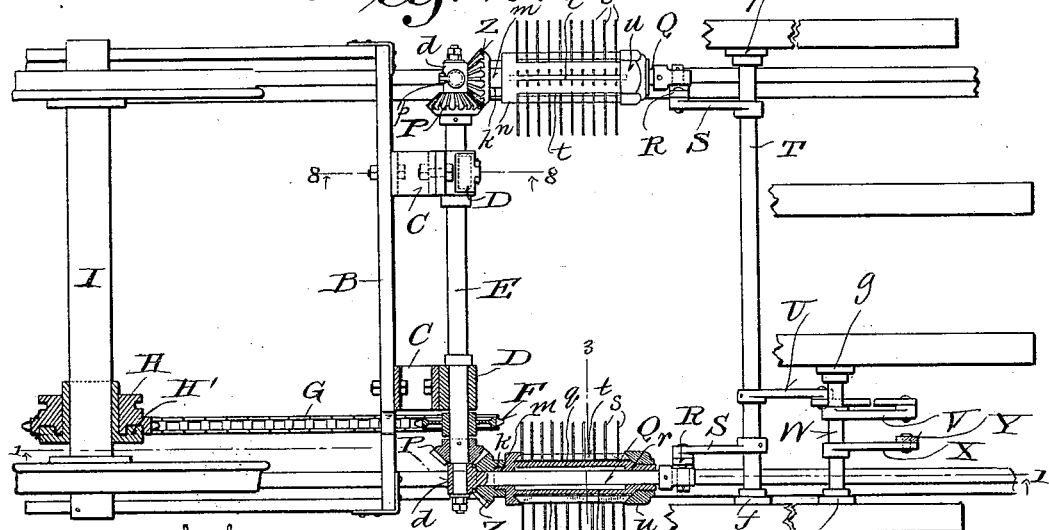
Fig. 2.
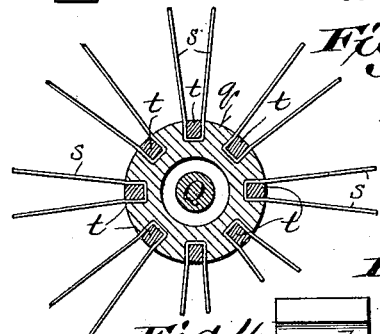
Fig. 3.
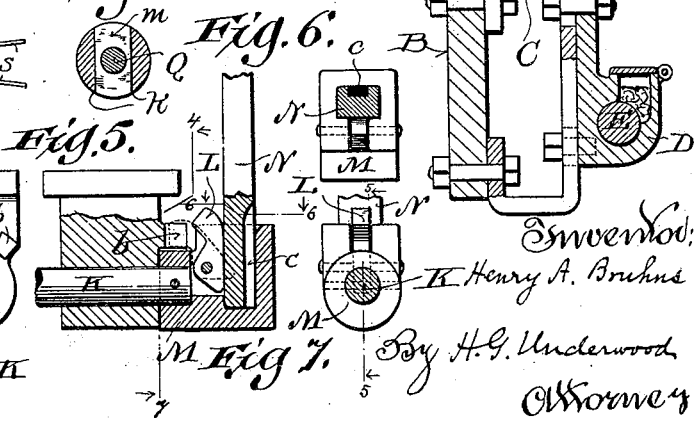
Witnesses:
Geo. W. Young.
N. E. Oliphant.
Inventor:
Henry A. Bruhns
By H. G. Underwood
Attorney

UNITED STATES PATENT OFFICE.

HENRY A. BRUHNS, OF MILWAUKEE, WISCONSIN.

RAIL-SWEEPER.

SPECIFICATION forming part of Letters Patent No. 547,061, dated October 1, 1895.

Application filed February 11, 1895. Serial No. 537,855. (No model.)

*To all whom it may concern:*

Be it known that I, HENRY A. BRUHNS, a citizen of the United States, and a resident of Milwaukee, in the county of Milwaukee and State of Wisconsin, have invented certain new and useful Improvements in Rail-Sweepers; and I do hereby declare that the following is a full, clear, and exact description thereof.

My invention has for its object to provide a simple, economical, and practical rail-sweeping mechanism for use in connection with street-cars; and it consists in certain peculiarities of construction and combination of parts hereinafter specified with reference to the accompanying drawings, and subsequently claimed.

In the drawings, Figure 1 represents an elevation, partly in section, on line 1 1 of the succeeding figure, and illustrates my improved rail-sweeping mechanism in connection with a street-car; Fig. 2, a plan view, partly in horizontal section, on line 2 2 of the preceding figure; Fig. 3, a sectional view of one of the brushes taken on line 3 3 of Fig. 2; Fig. 4, a detail elevation, partly in section, on line 4 7 of the succeeding figure; Fig. 5, a detail sectional view on line 5 5 of Fig. 7; Fig. 6, a detail plan view, partly in section, on line 6 6 of the preceding figure; Fig. 7, a detail elevation, partly in section, on line 7 4 of Fig. 5; Fig. 8, a detail sectional view on line 8 8 of Fig. 2, and Fig. 9 a similar view on line 9 9 of Fig. 1.

Referring by letter to the drawings, A represents the bottom of an ordinary street-car and B a life-guard joined to one of the car-trucks. Fast to the life-guard are brackets C, and in vertically-adjustable connection with these brackets are bearings D for a shaft E, it being preferable to form said bearings with cups for lubricant. The details of construction by which the vertical adjustment of the shaft-bearings is effected and maintained may be such as are found most convenient in practice, although the set-bolt and slot connection shown in Fig. 8 is well adapted for the purpose. In some instances it may be desirable to omit the brackets C and have the bearings D vertically adjustable on the life-guard.

A sprocket-wheel F, fast on the shaft E, is connected by a link-belt G with a sprocket-toothed adjustable section H of a clutch on an axle I of the car, and a spanner J engaging said adjustable section of the clutch is joined to a shaft K, arranged in bearings depending from the car-bottom.

The forward bearing for the shaft K has its front face provided with teeth $b$ at suitable intervals, as best illustrated in Fig. 4, and a dog L, pivoted in a box M, fast on said shaft, automatically drops into the intervals between teeth to lock the aforesaid shaft in the position necessary to hold the clutch-section H in or out of engagement with the other clutch-section H', fast on the car-axle I, above specified.

Engageable with the box M on the shaft K is the lower end of a hand-bar N, having one side thereof provided with a recess $c$, that clears the locking-dog L when it is not desirable to tilt the same out of working position. However, when the bar is inserted in the box with its plain side toward the dog the latter will be swung on its pivot to disengage with the adjacent bearing, and thus permit a rock of the shaft K to thereby throw the movable clutch-section in or out of engagement with the one that is fast on the car-axle, according as it is desirable to start or stop rotation of the other shaft E above specified.

Fast on the shaft E are bevel-gear wheels P, and loosely engaging the ends of said shaft adjacent to said gear-wheels are the sleeve ends $d$ of brush-spindles Q, that are joined at their other ends by links R to cranks S in rigid connection with a transverse rod T, loose in vertical hangers $f$ and provided with other cranks U in link connection with similar devices V, fast on another rod W, loose in hangers $g$ parallel to the one aforesaid. The rod W has another crank X in pivotal connection with the lower end of a notched lift-and-push bar Y, that is extended through a slot $h$ in the car-platform. A plate $i$ overlaps the slot $h$ to engage with any one of the notches in the lift-and-push bar Y, and the latter is held up against the plate by means of a spring $j$, as clearly illustrated in Fig. 1.

Slipped on each brush-spindle is a beveled gear-wheel Z, that meshes with one of the similar devices P on the shaft E, and a groove $k$ in the hub of said gear-wheel Z is engaged by a rib $m$ on the adjacent head $n$ of the brush that is loose on said spindle.

By means of the bar-controlled crank-and-link mechanism above specified the spindles Q are tilted on the shaft E to bring the brushes in or out of contact with the street-rails, and it will be seen that this operation does not in any way affect the engagement of the intermeshing gear-wheels P Z hereinbefore set forth, this being one of the main advantages of my improvements. It therefore follows that the brushes may be lifted at any time without stopping their rotation, and it not requiring that the gear-wheels P Z be brought in and out of gear there is little liability of their cogs becoming unduly worn or broken. If found desirable in practice, the sleeve ends $d$ of the brush-spindles may be provided with grease-cups $p$, as shown in Fig. 2.

Any convenient form of brushes may be utilized, but those herein shown are preferred, and in matters of detail each of the same comprises a cylindrical shell $q$, having its heads $n$ $r$ provided with apertures for the spindle Q, on which they turn. Exteriorly each brush-shell is longitudinally grooved at intervals to receive bent wires $s$ and clamping-bars $t$, the latter being fitted in the bends of said wires, as best illustrated in Fig. 3. Both ends of each clamping-bar $t$ are beveled, as shown in Figs. 1 and 2, and one end of each shell-groove is also correspondingly beveled. A nut $u$, run on the head $r$ of each brush-shell, has a beveled inner end that matches the opposing ends of the clamping-bars in said shell, and by the adjustment of this nut said clamping-bars are wedged down tight against the bends of the wires $s$ above specified.

Each bent wire diverges in opposite directions from the clamping-bar that holds it in a shell-groove, and in practice the wires are set as close to each other as possible, although I have herein shown them at intervals of their respective shells in order to more clearly illustrate the construction and arrangement of parts sought to be covered.

A brush of the construction above specified is economical and the wires may be readily replaced whenever necessary by unskilled labor. It will also be understood that the vertical adjustment of the shaft-bearings D is proportionate to the length of the brush-wires in order that the latter may come into contact with the street-rails when the spindles Q are swung down.

Having thus described my invention, what I claim as new, and desire to secure by Letters Patent, is—

1. The combination of a street-car provided with vertically adjustable bearings, a shaft arranged in the bearings, spindles in loose sleeve connection with the shaft, brushes loose on the spindles, gear connections between said shaft and brushes, suitable mechanism for tilting said spindles, and other suitable mechanism for transmitting motion from an axle of the car to the aforesaid shaft.

2. The combination of a street-car provided with vertically adjustable bearings, a shaft arranged in the bearings, a clutch-controlled sprocket-wheel and link-belt mechanism between an axle of the car and the shaft, spindles in loose sleeve connection with said shaft, brushes loose on the spindles, gear-connections between the aforesaid shaft and brushes, and suitable mechanism for tilting said spindles.

3. The combination of a street-car provided with vertically adjustable bearings, a shaft arranged in the bearings and having bevel gear-wheels fast thereon, suitable mechanism for transmitting motion from an axle of the car to the shaft, spindles in loose sleeve connection with said shaft, brushes loose on the spindles, other bevel gear-wheels connected to the brushes to mesh with those aforesaid, and suitable means for tilting said spindles.

4. The combination of a street-car provided with vertically adjustable bearings, a shaft arranged in the bearings and having bevel gear-wheels fast thereon, suitable mechanism for transmitting motion from an axle of the car to the shaft, spindles in loose sleeve connection with said shaft, other bevel gear-wheels slipped on the spindles to mesh with those aforesaid, brushes loose on said spindles but interlocked with the gear-wheels that are slipped thereon, and suitable means for tilting the aforesaid spindles.

5. The combination of a street-car provided with bearings, a shaft arranged in the bearings, rail-sweeping brushes in gear with the shaft, a clutch-controlled sprocket-wheel and link-belt mechanism between an axle of the car and said shaft, a rock-shaft connected to the movable section of the clutch, a box fast to the latter shaft, and a pivotal dog in the box engageable with an adjacent stationary device.

6. The combination of a street-car provided with bearings, a shaft arranged in the bearings, spindles in loose sleeve-connection with the shaft, rail-sweeping brushes loose on the spindles and in gear with said shaft, a lift-and push bar, and a link-and-crank mechanism connecting said spindles and bar.

7. The combination of a street-car, drive-mechanism that derives motion from an axle of the car, and a driven-brush comprising a shell having exterior grooves beveled at one end, bent wires arranged in the grooves, beveled ended bars laid in against the bends of the wires, and a beveled nut run on a head of the brush against opposing ends of the bars.

In testimony that I claim the foregoing I have hereunto set my hand, at Milwaukee, in the county of Milwaukee and State of Wisconsin, in the presence of two witnesses.

HENRY A. BRUHNS.

Witnesses:
N. E. OLIPHANT,
HENRY DANKERT.